United States Patent [19]

Komorizono

[11] 4,393,655
[45] Jul. 19, 1983

[54] RESERVOIR FOR A MASTER CYLINDER

[75] Inventor: Junichi Komorizono, Toyota, Japan

[73] Assignee: Aisin Seiki Kabushiki Kaisha, Kariya, Japan

[21] Appl. No.: 235,045

[22] Filed: Feb. 12, 1981

[30] Foreign Application Priority Data

Feb. 19, 1980 [JP] Japan .............................. 55-19890[U]

[51] Int. Cl.³ .............................................. B60T 11/26
[52] U.S. Cl. ....................................... 60/585; 60/592; 220/378
[58] Field of Search ................... 60/585, 592; 220/203, 220/378

[56] References Cited

U.S. PATENT DOCUMENTS

| 4,103,492 | 8/1978 | Sakazume | 60/588 |
| 4,192,345 | 3/1980 | Fujii | 60/592 |
| 4,200,163 | 4/1980 | Bass | 60/592 |
| 4,208,881 | 6/1980 | Brademeyer | 60/592 |
| 4,249,381 | 2/1981 | Gaiser | 60/592 |

FOREIGN PATENT DOCUMENTS

| 55-47001 | 4/1980 | Japan | 60/592 |
| 2028445 | 3/1980 | United Kingdom | 60/585 |

Primary Examiner—Abraham Hershkovitz
Attorney, Agent, or Firm—Finnegan, Henderson, Farabow, Garrett & Dunner

[57] ABSTRACT

A master cylinder assembly has a reservoir mounted on the master cylinder body. The reservoir includes a reservoir body having a top opening and a cap attached to the reservoir body for covering the top opening. Between the reservoir body and the cap, there is disposed a flexible diaphragm which also covers the top opening of the reservoir body. A depressing plate is provided between the cap and the diaphragm for forcing the peripheral portion of the diaphragm against the reservoir body when the cap is attached to the reservoir body. Projection and aperture arrangements are provided between the diaphragm and the depressing plate so that they can be held together. The cap is formed with hook-shaped portions for engagement with the outward edge of the depressing plate. The cap, the depressing plate and the diaphragm can be assembled together before they are installed on the reservoir body.

3 Claims, 9 Drawing Figures

RESERVOIR FOR A MASTER CYLINDER

The present invention relates to a reservoir for a master cylinder device such as a brake master cylinder.

Conventionally, a master cylinder reservoir includes an open top reservoir body adapted to be attached to a master cylinder body and a reservoir cap attached to the top opening of the reservoir body for closing the same. Between the reservoir body and the cap, there is disposed a flexible diaphragm which has a peripheral portion interposed between the reservoir body and the reservoir cap. In order to force the peripheral portion of the diaphragm into sealing engagement with the top peripheral portion of the reservoir, a depressing plate member is disposed between the periphery of the cap and the peripheral portion of the diaphragm so that, when the cap is securely attached to the reservoir body, the diaphragm is fitted at the peripheral portion to the reservoir body with a fluid-tight seal. In order to prevent the peripheral portion of the diaphragm from slipping radially inwardly into the top opening of the reservoir body, the peripheral portion of the diaphragm is composed of a substantially flat portion having radially outer and inner edges and top and bottom surfaces the main flexible portion of the diaphragm starting at the bottom surface of the flat portion. The depressing member is formed at the radially inner edge with a downwardly extending flange which is adapted to be engaged with the inner edge of the flat portion of the diaphragm to thereby restrain the flat portion of the diaphragm in the radial direction.

In the conventional structure, however, inconveniencies have been encountered in assembling the parts. In fact, the reservoir has to be assembled by placing the diaphragm, the depressing plate and the cap in this order on the reservoir body and securing them to the reservoir body by means of screws. Thus, careful handling is required in order to prevent these parts from being displaced or slipping before they are secured to the reservoir body. Further, the downward flange on the depressing member often fails to engage the inner edge of the flat portion of the diaphragm, instead engaging the top surface of the flat portion to thereby force the flat portion into the opening of the reservoir body. This results in a poor seal between the reservoir body and the diaphragm.

It is therefore an object of the present invention to provide a reservoir structure which is convenient to assemble.

Another object of the present invention is to provide a reservoir structure in which a positive sealing can be ensured.

According to the features of the present, a diaphragm, a depressing plate and a cap can be held together to provide a sub-assembly which can then be placed on the top peripheral edge portion of a reservoir body to be secured thereto. There is no risk that the peripheral portion of the diaphragm is displaced during the assembling operation because it is secured on the depressing plate during advance assembly.

The above and other objects and features of the present invention will become apparent from the following description of a preferred embodiment with reference to the accompanying drawing, in which.

Figure 1:
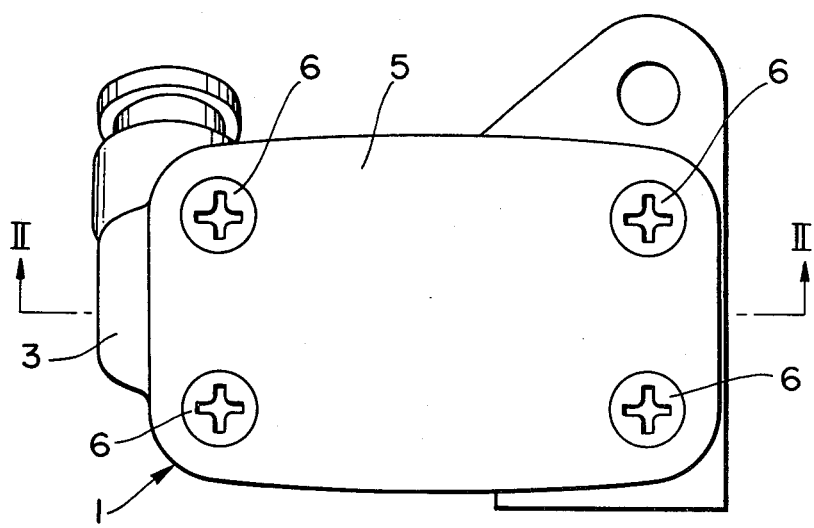
FIG. 1 is a plan view of a master cylinder assembly having a reservoir to which the present invention can be applied.
Figure 2:
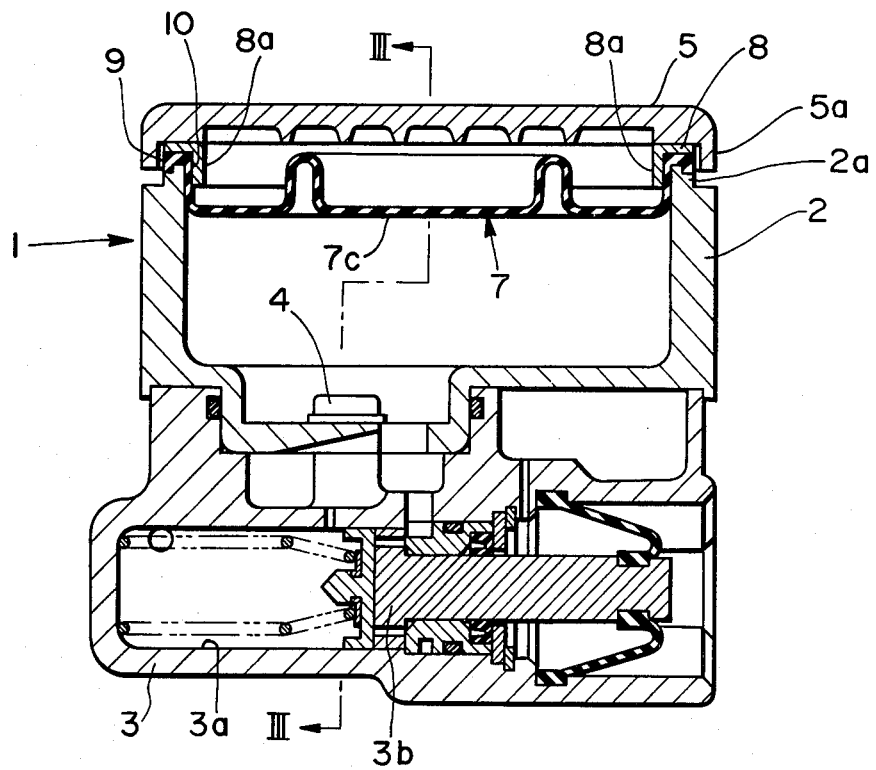
FIG. 2 is a sectional view taken substantially along the line II—II in FIG. 1 and showing one embodiment of the present invention.
Figure 3:
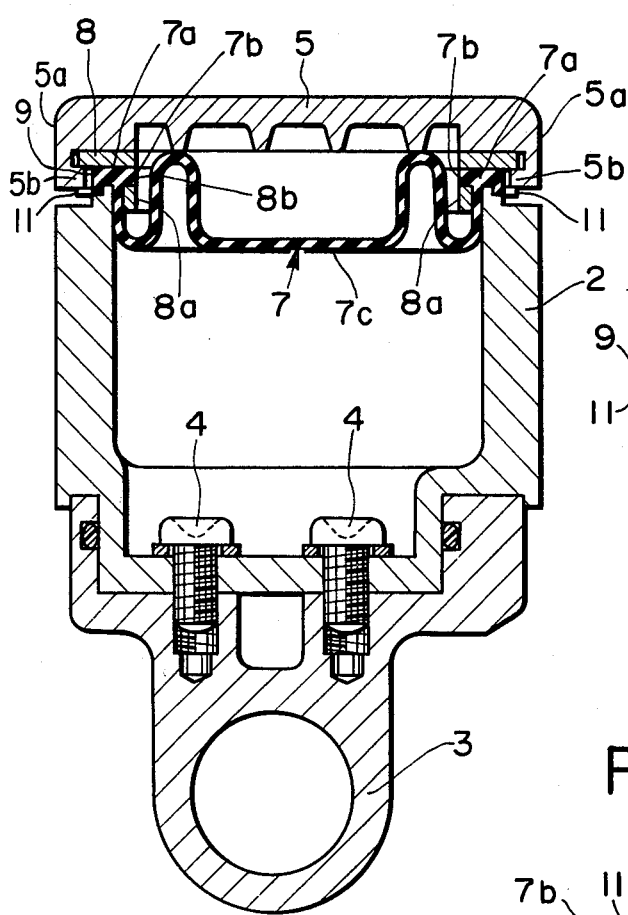
FIG. 3 is a sectional view taken along the line III—III in FIG. 2.

Referring now to the drawings, particularly to FIGS. 1 through 3, there is shown a master cylinder assembly including a reservoir 1 mounted on a master cylinder body 3. The master cylinder body 3 has a cylinder bore 3a in which a master cylinder plunger assembly 3b is received in a conventional manner to form a master cylinder device.

The reservoir 1 comprises a reservoir body 2 which is placed above the master cylinder body 3 and secured thereto by means of screws 4. The reservoir body 2 has a top opening defined by a top peripheral edge 2a and a cap 5 provided for covering the top opening of the reservoir body 2. The reservoir body 2 and the cap 5 may be made of any suitable material, such as a plastic material. Between the reservoir body 2 and the cap 5, there is disposed a flexible diaphragm 7 which includes a peripheral portion 7a and a flexible portion 7c. The flexible portion 7c is located so as to cover a substantial portion of the top opening in the reservoir body 2, and the peripheral portion 7a is interposed between the top peripheral edge 2a of the reservoir body 2 and the cap 5. Between the peripheral portion 7a of the flexible diaphragm 7 and the cap 5, there is provided a depressing plate 8.

Figure 5:
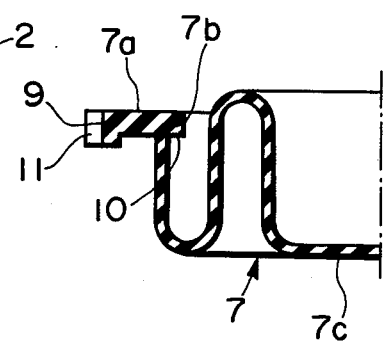
FIG. 5 is a fragmentary sectional view of the diaphragm taken along the line V—V in FIG. 4.
Figure 4:
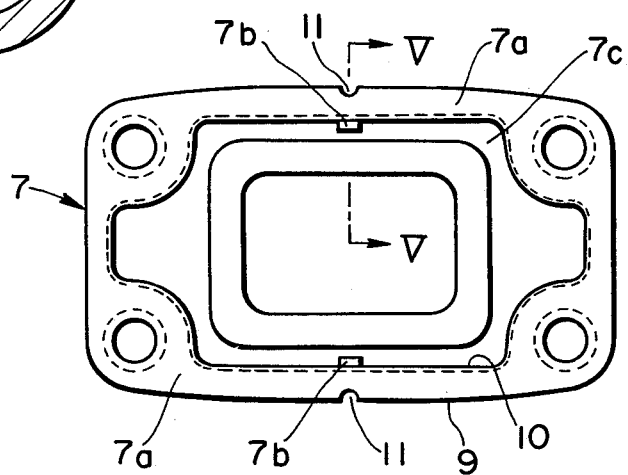
FIG. 4 is a plan view of the diaphragm used in the structure shown in FIGS. 2 and 3.
Figure 6:
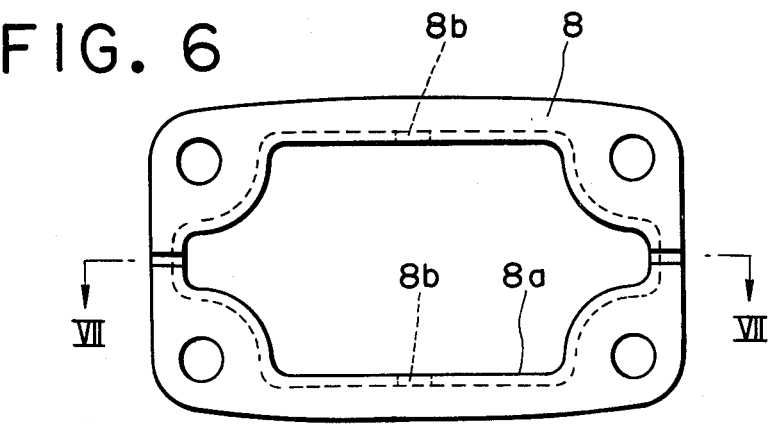
FIG. 6 is a plan view of the depressing plate used in the structure shown in FIGS. 2 and 3.
Figure 7:
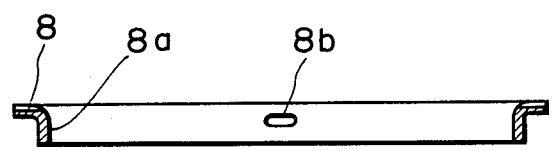
FIG. 7 is a sectional view taken along the line VII—VII in FIG. 6.

As shown in FIGS. 4 and 5, the peripheral portion 7a of the diaphragm 7 is of a substantially flat configuration having a radially outward edge 9 and a radially inward edge 10 and the flexible portion 7c of the diaphragm 7 starts from the lower surface of the peripheral portion 7a in the vicinity of the radially inward edge 10. The depressing plate 8 is of a substantially L-shaped configuration having a downwardly extending flange 8a as shown in FIGS. 6 and 7. The flange 8a is adapted for engagement with the radially inward edge 10 of the peripheral portion 7a in the diaphragm 7 for restraining the radially inward displacement of the peripheral portion 7a. The cap 5, the depressing member 8 and the peripheral portion 7a of the diaphragm 7 are secured to the reservoir body 2 by means of screws 6.

Figure 8:
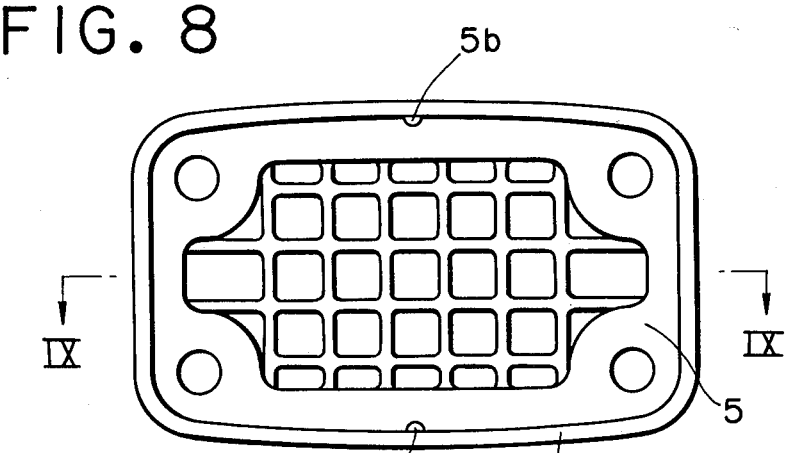
FIG. 8 is a plan bottom view of the cap used in the structure shown in FIGS. 2 and 3.
Figure 9:
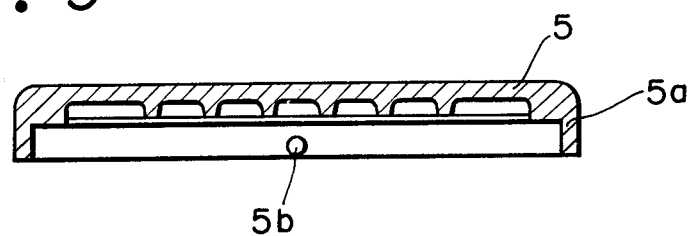
FIG. 9 is a sectional view taken along the line IX—IX of FIG. 8.

Referring to FIGS. 6 and 7, it will be noted that the depressing plate 8 is formed at the flange 8a with a pair of apertures 8b which are located at diametrically opposite portions. The diaphragm 7 is formed at the radially inward edge 10 with a pair of inward projections 7b as shown in FIGS. 3, 4 and 5. The projections 7b are located at positions confronting to the apertures 8b so that they can be fitted to the apertures 8b to thereby hold the diaphragm 7 and the depressing plate 8 together. In FIGS. 3, 8 and 9, it will be noted that the cap 5 is formed at the periphery thereof with a downwardly extending shift portion 5a which is provided with a pair of diametrically opposed inward projections 5b. The projections 5b are adapted to be engaged with the bottom surface of the depressing plate 8 so that the depressing plate 8 is held together with the cap 5. As shown in FIG. 4, the diaphragm 7 is formed with a pair of relief cutouts 11 at the outward edge 9 of the peripheral portion 7a for avoiding an interference with the projections 5b on the cap 5.

In the structure described above, the depressing plate 8 is assembled with the diaphragm 7 through the engagement of the apertures 8b with the projections 7b. Further, the depressing plate 8 can be fitted to the cap 5 through the engagement with the projections 5b on the cap 5. Thus, the cap 5, the depressing plate 8 and the diaphragm 7 can be held together to form a sub-assembly which is then placed on the top peripheral edge 29 of the reservoir body 2 and secured thereto by the screws 6.

The invention has thus been shown and described with reference to a specific embodiment, however, it should be noted that the invention is in no way limited to the details of the illustrated structures but changes and modifications may be made without departing from the scope of the appended claims.

I claim:

1. A reservoir for a master cylinder which comprises a reservoir body adapted to be placed above and secured to a master cylinder body and having a top opening defined by a top peripheral edge portion, a cap adapted to be secured to the reservoir body for closing the top opening, a flexible diaphragm disposed between the reservoir body and the cap, said diaphragm including a flexible portion substantially covering the top opening of the reservoir body and a peripheral portion adapted to be interposed between the top peripheral edge portions of the reservoir body and the cap, a depressing plate interposed between the peripheral portions of the diaphragm and the cap, and restraining means provided on the depressing plate for engagement with the peripheral portion of the diaphragm to thereby restrain it from a radially inward movement, said cap being provided with a pair of hook-shaped portions for engagement with an outer edge of said depressing plate for securing said depressing plate to said cap, and said diaphragm being formed with a pair of inward projections engaging apertures in said depressing plate for securing said diaphragm to said depressing plate such that said cap, depressing plate, and diaphragm form a sub-assembly to be placed on the reservoir body.

2. In a reservoir for a master cylinder having a reservoir body with a top opening defined by a top peripheral edge, a cap assembly for closing said top opening comprising:
   (a) a cap adapted to cover said top opening, said cap including an integral, depending flange at its periphery and a pair of cap projections integral with and extending inwardly from said flange;
   (b) a flexible diaphragm adapted to be disposed between said cap and said reservoir body and to substantially cover said top opening, said diaphragm including an outwardly extending peripheral portion adapted to be disposed between said cap and said top peripheral edge and a pair of integral, inwardly extending diaphragm projections; and
   (c) a depressing plate disposed between said cap and the peripheral portion of said diaphragm including means engaging the peripheral portion of said diaphragm for restraining radially inward movement of said diaphragm after said assembly is secured to said reservoir body, said depressing plate being engaged by said cap projections to secure said depressing plate in said assembly and said depressing plate having a pair of apertures for engaging said diaphragm projections to secure said diaphragm in said assembly.

3. A reservoir for a master cylinder in accordance with claim 1 or 2, in which said peripheral portion of said diaphragm has a radially outward and inward edges and said restraining means includes a downwardly extending flange formed on said depressing plate for engagement with the radially inward edge of the peripheral portion of said diaphragm.

* * * * *